UNITED STATES PATENT OFFICE.

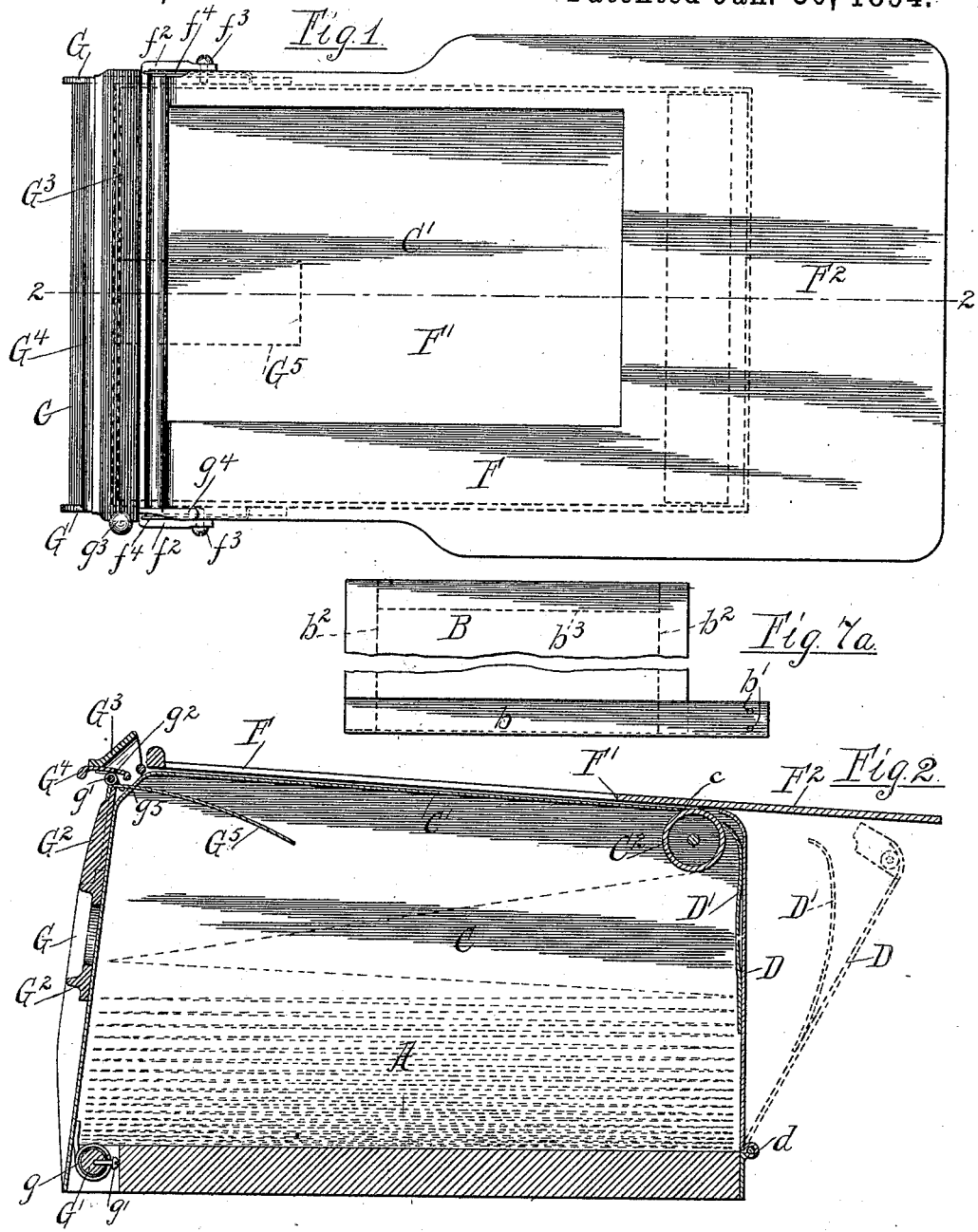

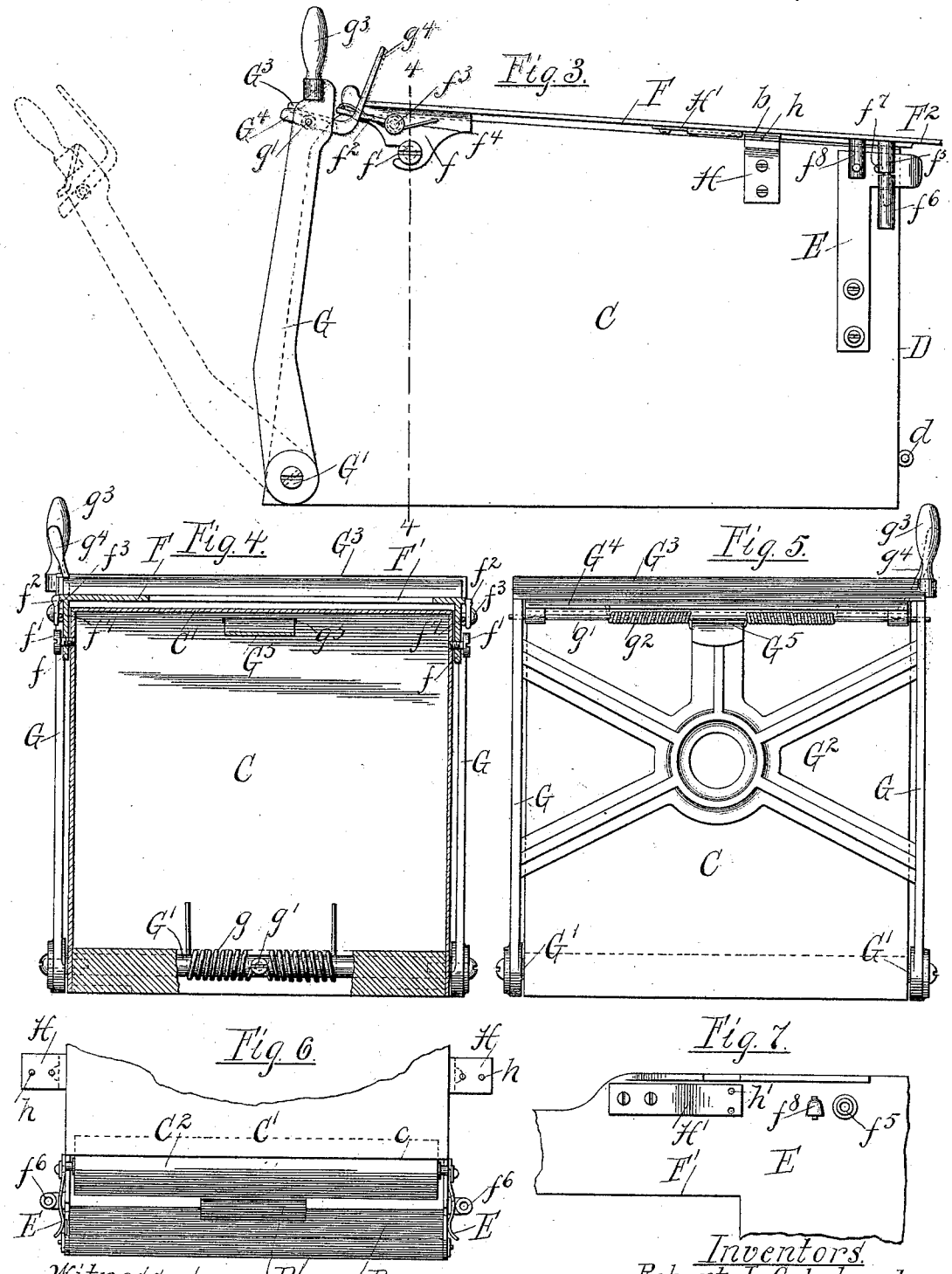

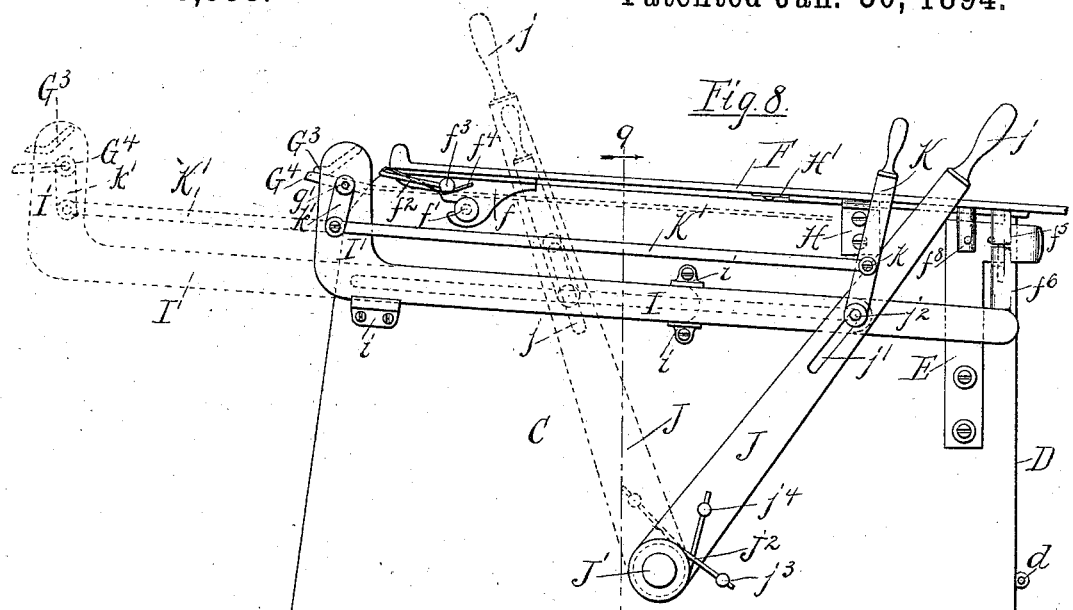
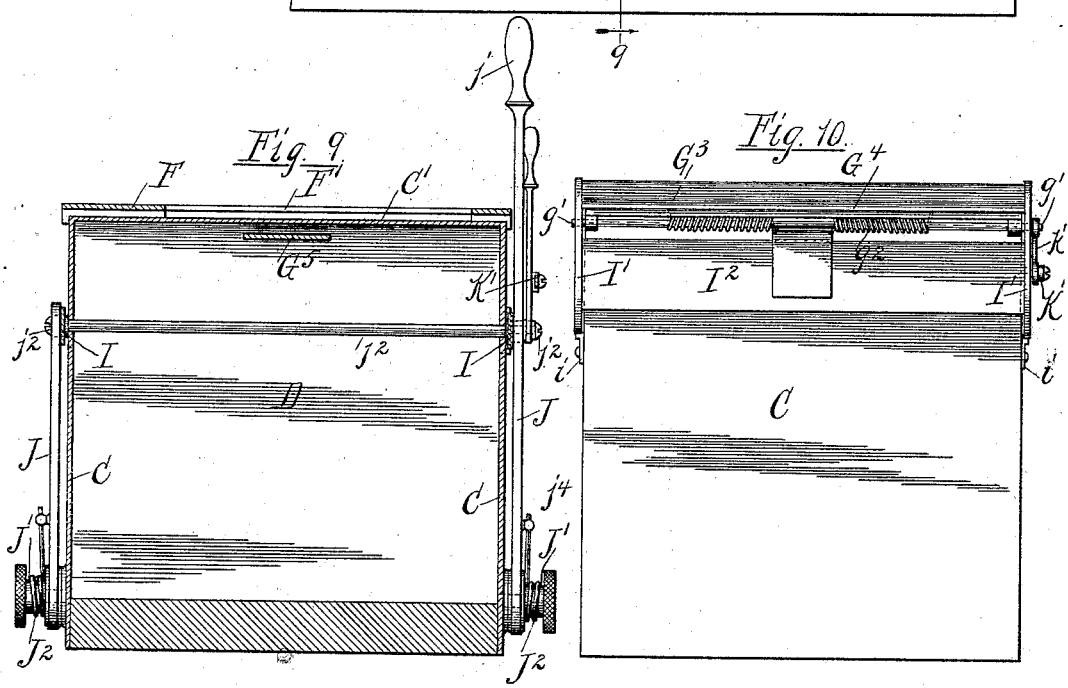

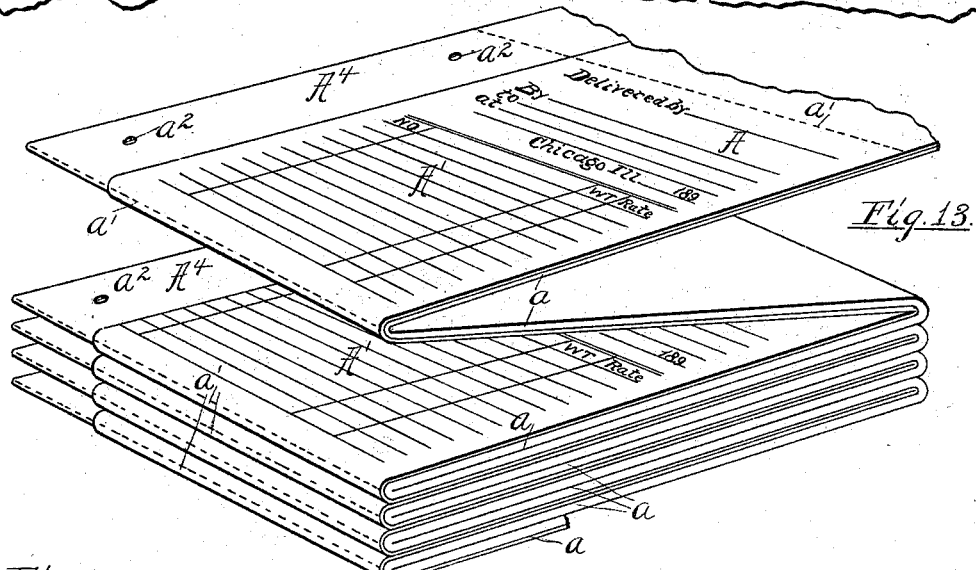

ROBERT J. COPELAND AND CHRISTIAN H. STOELTING, OF CHICAGO, ILLINOIS, ASSIGNORS TO SAID COPELAND AND WILLIAM A. VAWTER, OF SAME PLACE.

AUTOGRAPHIC RECORDING DEVICE.

SPECIFICATION forming part of Letters Patent No. 513,558, dated January 30, 1894.

Application filed January 26, 1893. Serial No. 459,909. (No model.)

*To all whom it may concern:*

Be it known that we, ROBERT J. COPELAND and CHRISTIAN H. STOELTING, residents of Chicago, in the county of Cook and State of Illinois, have invented certain new and useful Improvements in Autographic Recording Devices; and we do hereby declare that the following is a full, clear, and exact description thereof, reference being had to the accompanying drawings, and to letters of reference marked thereon, which form a part of this specification.

Our invention relates to that class of appliances which are used in making written memoranda, such as shipping manifests, bills of lading, cash or sales checks, and various other kinds of memoranda.

Our invention more particularly relates to such memoranda as are made upon printed blank forms which are simultaneously written, by manifolding, in multiple form.

The primary object of our invention is to produce a mechanism which shall so deliver or feed the sets of sheets which carry the blank forms, that such forms shall always and invariably register, face to back, with each other; so that a written entry made upon a particular part of the original blank form shall be copied upon exactly the corresponding part of the other form or forms of the set.

A further object of our invention is to produce a mechanism which shall accurately feed or deliver the sheets, in such manner as to remove the filled blanks from the position in which they were when written upon, and to bring unwritten blanks into position to be written upon; still further, to produce a mechanism which shall quickly and neatly sever the filled forms from those which are to be written upon or filled, and the manipulations of which, to effect the feeding and severing of the blank forms, shall be of a simple and rapid character.

To the above purposes, our invention consists in certain peculiar and novel features of construction and arrangement, as hereinafter described and claimed.

The more precise nature of our invention will be better understood when described with reference to the accompanying drawings, in which—

Figure 1 is a plan view of a manifolding autographic-recorder embodying our invention. Fig. 2 is a vertical longitudinal section of the same, taken on the line 2—2 of Fig. 1. Fig. 3 is a side elevation of the same; the operative movement of the delivering-arms being shown in dotted lines. Fig. 4 is a transverse section of the same, taken on the line 4—4 of Fig. 3; the direction of view being toward the front end of the mechanism, as indicated by the arrows applied to the section-line. Fig. 5 is a front end elevation of the recording-mechanism. Fig. 6 is a plan view of a rear end portion of the mechanism, the rear end wall of the casing being slightly opened. Fig. 7 is an under side plan view of a middle portion of the casing top or rest. Fig. 7ª is a plan view of one of the transfer-sheets and its holding-attachments. Fig. 8 is a side elevation of a modified form of the recording-mechanism, the operative movements of the feeding-slide and its connections being shown in the dotted lines. Fig. 9 is a transverse vertical section of the mechanism shown in Fig. 8; the section being taken on the line 9—9 of Fig. 8, and the direction of view being rearward, as indicated by the arrows applied to the section-line. Fig. 10 is a front elevation of the mechanism shown in Figs. 8 and 9, the operating-handles being omitted. Fig. 11 is a plan view, of a portion of one of the multiple blanks used with the recording-mechanism, the blank being laid open. Fig. 12 is a similar view of the multiple blanks folded. Fig. 13 is a perspective view of the blanks folded and laid as in use. Fig. 14 is a cross-section of a modified form of the blanks.

Previous to our present invention, various contrivances have been devised for simultaneously moving a number of superposed layers of paper with intervening transfer-sheets into such position as to be conveniently written upon and simultaneously manifolded or transferred from the original sheet to the duplicate sheets. The sheets have heretofore been in the form of continuous strips or webs, and have been reeled upon drums or rolls from which the strips or webs have been drawn out, as required, upon a platen or rest, so as to be conveniently written upon. When the nature of the memoranda has been such that no printed forms were required to be filled by the memoranda, these previous types of contrivances have sufficed, to a limited extent; but where printed blank forms are required the previous contrivances mentioned are wholly unsuited to the requirements of the work. The reason of such unsuitableness is, that where a plurality of like forms are placed properly for manifolding, each space of one blank form must accord precisely, back to face, with a like space of each of the other blank forms, so that when a manuscript entry is made in any space of the original blank form, it shall be invariably reproduced (by manifolding) in precisely the like space of each of the other form. Otherwise serious confusion will occur; such for example, as the name of the consignor, in an original shipping-blank, being reproduced in the consignee's space of the duplicate blank; or, in a cash-entry blank, the name of the payer, may appear, in the duplicate blank-form, as that of the payee. When wound upon drums or rolls, the under or inner layers of the multiple-blank sheets "creep" upon each other, owing to the constantly varying differences of diameter of the wound layers; such creeping being perhaps slight at any given moment, but being constantly progressive, so that even after a short period of use, the several blank-forms will have been moved perceptibly and seriously out of register with each other. As above stated, it is the primary object of our invention to prevent this relative misplacement of the multiple blank forms, and, as will be seen from the ensuing description, we have produced a mechanism which fully accomplishes this object and which maintains at all times the precise register of the multiple blanks with each other.

Before describing the mechanism which embodies our present invention, we will briefly describe the multiple blank forms which are peculiarly adapted for use in connection with the mechanism, these blank forms being claimed in a separate application for Letters Patent filed on even date with this application, and by Robert J. Copeland, one of the present applicants.

Referring to Figs. 11, 12 and 13, A designates a continuous strip or web of paper or other suitable material upon which the blank-forms are printed; this strip or web being of any desirable length and width according to the requirements of the particular blanks to be used. As shown, shipping-blanks are printed in triplicate upon the strip or web A; such shipping-blanks being usually prepared in triplicate, so that, after being properly filled, one blank can be retained by the consignor, a second delivered to the carrier or transporter, and the third forwarded as an advice to the consignee. The strip or web is shown as divided by two parallel longitudinal lines $a, a$, of scores or perforations into three longitudinal spaces or sections $A', A^2, A^3$, and also as divided at regular intervals, by parallel transverse lines $a'$ of scores or perforations, into horizontal spaces or sections each of which contains one of the blank forms; the middle series of blank-forms being printed upon the reverse side of the strip or web from that occupied by the two other series of blank-forms, so as to accord with the requirements of folding. There are thus a number of series of multiple blank-forms provided three of which sets or series are each composed of forms arranged in longitudinal order or sequence, and also any desirable number of transverse sets each of which is composed of three blank-forms arranged side by side. The precise character of the blank-forms is, of course, to be determined by the nature of the business in which they are used, but, the forms shown each compose a heading having blank spaces for the name of the party delivering the goods, blank spaces for the names of the consignor, the carrier or transporter, the consignee, the address of consignee, and for the date. The body of each blank-form, as shown, comprises a number of horizontal ruled lines divided at the left hand into a vertical column in which the numbers of articles are to be entered, a middle column in which the names of the articles are to be entered, and two columns, at the right, in which the weights and rates of charges respectively are to be entered; these columns being shown as properly headed. When used, the strip or web is twice folded longitudinally upon its scores $a$, and is then folded also transversely, in alternately opposite directions, upon its scores $a'$; the latter folds enabling the strip or web to be piled, accordion-fashion, in superposed layers, as shown in Fig. 13. The longitudinal folds are both so placed as to bring each of the three blank forms into precise face to back register with each other, and it will be obvious that both the longitudinal and transverse folds retain the blank forms in such register and also prevent displacement of the forms from such register. The perforations $a$ and $a'$ may be dispensed with, if preferred, but the folds are to be made at the points indicated by the perforations. The perforations are usually employed, however, and it is preferable also that the outer margins $A^4$ of those blanks which are to be retained by the consignor should be laterally extended, as shown, and also provided with holes $a^2$, so as to facilitate the insertion of these blanks into a file case or holder.

In Fig. 14 we have shown an arrangement in which the sections $A', A^2$, and $A^3$, are separate from each other; the longitudinal folds $a$ being, in this instance, omitted, but the transverse folds $a'$ are preserved; these transverse folds $a'$ alone are capable of effectually preventing displacement of the blank forms from register with each other. The strip is so folded longitudinally, on the scores $a$, that the blanks $A'$ shall lie above the blanks $A^2$, while the blanks $A^3$ shall lie below said blanks $A^2$ and sheets B, B', of transfer or carbon paper are inserted at opposite sides of the folded web, so as to intervene between the duplicate forms, and thus each to transfer the written entries to the next underlying blank form.

We will now describe the mechanism in connection with which the blank forms, above briefly described, are used; first referring to Figs. 1 to 7 both inclusive. In these figures, C designates the casing or box for containing the multiple blank-forms, and within and also upon which the various operative parts of the mechanism are mounted, as hereinafter fully described. As shown, this casing or box is of approximately rectangular form, having a closed bottom and front end, and also having closed sides. The interior of this box or casing C is practically unoccupied by any of the operative mechanism, so that an unobstructed space or compartment is provided for containing the pile of multiple blank forms, designated as a whole in Fig. 2 by the reference-letter A. The upper side of the box or casing C is provided with a permanent top-piece C', which extends from side to side of the casing and also from the front end of said casing nearly to the rear end thereof; the rear margin of this top-piece being such a distance from the rear end of the casing as to leave an elongated opening $c$ through which the layers or the folded strips are passed into position to be written upon. The top-piece C' may, of course, be extended entirely to the rear end of the casing, if preferred, and the opening $c$ may be in the form of a slot, in the rear end portion of the top-piece. A guide-roller $C^2$ is mounted horizontally in the upper rear corner of the casing C, the outgoing portion of the strips or web being trained upwardly behind said roller, as shown in Fig. 2. The rear end of the casing is closed by a movable wall D which is hinged at its lower end to the rear end of the casing C, as shown at $d$, the arrangement being such that the end-wall D can be tilted rearward and downward so as to afford access to the interior of the casing, for placing the pile of paper therein. This tilting end-wall is shown as retained in its normal closed position by two flat spring-plates E, each of which is shown as secured by rivets, or otherwise suitably secured to the upper part of the rear end of one of the sides of the casing C, so that the upper end of each spring-plate shall protrude rearward beyond the rear end of the casing. When the end-wall D is closed, the protruding upper ends of the spring-plates E clasp the sides of the end-wall and so retain said end-wall in its closed position. To the inner side of the end-wall D is riveted or otherwise secured an upwardly extending spring-plate D', the upper end of which presses forwardly toward the roller $C^2$, when the end-wall D is closed. The upper end of this spring-plate D' comes into contact with the strip or web, as it passes over the roller $C^2$, and thus maintains a desirable tension upon that portion of the web which lies upon the top of the casing, so as to retain such portion of the strip in sufficiently flat and smooth condition to be easily written upon. Upon the top C' of the casing C is placed a removable skeleton plate F, which serves as a hand or arm rest, while the written entries are being made. This plate F, when in position, extends from a point just back of the front end of the casing top C' to and somewhat beyond the rear end of said top, and is of somewhat greater width than the width of the casing C. At each side, near its front end, the rest-frame F is formed with a downwardly extending hook-shaped lug $f$ the lower end of which opens forwardly and embraces a stud $f'$ upon the upper front corner of the casing C. Across the under side of the front end of the rest-frame F extends a presser-rod $f^2$ the ends of which are bent rearward at right angles from the bar and loosely embrace studs $f^3$ which protrude outwardly from the upper front corners of the casing C. A spiral spring $f^4$ is coiled around each stud $f^3$ and these two springs exert downward pressure upon the rod $f^2$, so as to cause said rod to press upon the outer end-portion of the strip or web of paper, and thus further insure its retention in flat and smooth position, while being written upon. From the under surface of the rest-frame F at each side and near the rear end of the same, depends a socket-lug $f^5$ into the lower end of which enters an upwardly projecting pin from a lug $f^6$, located at the upper rear corner of the side of the casing C; there being two of these lugs, one at each side of the casing. The hooked lugs $f$ and studs $f'$, and the socket-lugs $f^5$ and pin-lugs $f^6$ serve to retain the rest-frame in proper position upon the top C' of the casing C. The upper end portion of each spring-plate E is formed with a hole to secure one of two studs $f^7$ projecting outwardly from the upper ends of the sides of the end-wall D, so as to further insure the retention of the end-wall in closed position and the upper end of each spring-plate is also provided with a second hole to receive a stud which projects inwardly from the lower end of the corresponding one of two lugs $f^8$; these lugs $f^8$ being pendent from the under surface of the rest-frame, at each side and near the rear end of said rest-frame. Thus the lugs $f^8$ press the upper ends of the spring-plates E inward and so insure the engagement of the plates with the studs $f^7$, for the purpose stated, while the engagement of the studs of the lugs $f^8$ with the spring-plates E serve to further insure the retention of the rest-frame in its proper position upon the casing. This rest-frame is formed with a rectangular opening F' which extends from near one side of the frame to near the opposite side of the same, and also from near the front end of the frame toward the rear end thereof; the strip of the paper extending directly beneath this rest-frame and being exposed through the opening F' in convenient position to be written upon. The rear margin of the opening F' is sufficiently remote from the rear margin of the rest-frame to leave a closed rear end portion F² of the frame, upon which the user's wrist or fore-arm may rest while the written entries are being made. At the front end of the casing C are located two parallel arms G, each of which is placed at the front part of one side of the casing C and the lower ends of which are shown as rigidly secured to the outer ends of an oscillatory rod G', so as to be capable of tilting forward and downward, as presently to be fully explained. The oscillatory rod G' is located in the lower front corner of the casing C, so as to extend entirely across said casing and being of such length as to protrude at its ends through the sides of the casing. The rod G' is surrounded, at its middle portion, by a coiled spring $g$, the middle portion of which is secured to a stud or screw $g'$ projecting radially from the rod, and the ends of which press against the front end-wall of the casing C, the arrangement being such that when the arms G are released, after having been tilted forward and downward, said arms are returned into normal vertical position by the spring $g$. The two arms G are connected together by a spider-frame G² which compels the two arms to swing in unison. At their upper extremities, these two arms carry a severing-bar G³ which extends horizontally from one arm to the other. Immediately beneath the severing-bar G³ is located a rocking clamp-bar G⁴ through the ends of which pass loosely the outer end portions of a rod $g'$ which is inserted tightly at its ends into the upper end-portions of the arms G, so that said rod cannot turn axially. A spiral spring $g^2$ surrounds the connecting-rod and, at its ends, presses upwardly against the clamping-bar G⁴ so as to hold said bar normally firmly against the severing-bar G³. One of the arms G carries, at its upper end, a suitable handle $g^3$, by which both of the arms G are moved outward and downward, and at its corresponding or adjacent end, the clamping-bar G⁴ carries an extension or handle $g^4$ by means of which the clamping-bar can be tilted axially, when desired, so as to separate the clamping-bar from the contact with the severing-bar G³, as will be presently explained. At each side of the casing C, at the upper edge of the same, and nearer the rear end thereof, is secured one of two inverted L-shaped brackets H the upper arm of each of which extends horizontally outward from the casing, and carries on its upper side an upwardly extending stud $h$. To the under surface of the rest-frame F, at each side thereof, is secured a spring-arm H', the outer ends of said spring-arms pressing downward upon the upper ends of the studs $h$. The carbon or transfer sheets B, B', are each provided at its lower end with a rigid bar $b$, of sheet-metal or equivalent material, which embraces the edge of the sheet, or to which the edge of the sheet is secured in any suitable manner, so as to strain the sheet sidewise and thus maintain the sheet in flat condition. One end of the bar $b$ protrudes beyond the side of the carbon sheet and is formed with two holes $b'$ placed the one in front of the other. These holes are intended to receive the studs $h$ of the brackets H, and it will be seen that the downward pressure of the free rear ends of the springs H', upon the studs $h$ and bars $b$, prevents accidental dislocation of said bars $b$ from said studs. If preferred, one or more holes $h'$ may be formed through the free ends of the springs H' so as to receive the upper ends of the studs $h$, and thus further insure the retention of the bars $b$ in proper position. The carbon or transfer sheets B, B', may be held by the bars $b$, at their rear edges only, or said bars may be extended at the opposite side margins of the carbon-sheets, as indicated in dotted lines at $b^2$ in Fig. 7ª. If preferred also, there may be a cross-bar $b^3$ at the front end of each carbon-sheet B, B', so that said sheets shall each be inclosed by a rectangular rigid frame. The spider-frame G² carries at its upper end, midway of its width, a supporting-arm G⁵ which extends rearwardly into the box or casing C, through a slot $g^5$ in the front end thereof; and which is of segmental form, so as to extend downwardly also. When the arms G are tilted forward and downward, as hereinafter explained, this arm supports the outer end portion of the strip or web and thus prevents any accidental rupturing of the same. In using this mechanism, the pile of multiple blanks is placed within the casing or box C and the upper end of the strip or web is drawn over the roller C², through the opening $c$ and forward along the top C' of the casing; the carbon-strips B, B', are inserted laterally between the layers of the strip or web, and the end of the latter is carried beneath the presser-rod $f^2$ and gripped between the severing-bar G³ and the clamping-bar G⁴. The upper blank form is now filled, as required, and after this the arms G are tilted forward and downward; the filled blank and its manifolded duplicates being thereby drawn forwardly off of the top of the casing and a fresh or empty set of blanks being simultaneously drawn out of the interior of the box or casing C and upon the top C' thereof, in position to be written upon. Before retracting the arms G, the operator presses the extension or handle $g^4$, of the clamping-bar G⁴, forward, so as to separate said clamping-bar from contact with the severing-bar, and grasping the free end of the strip or web in one hand, allows the arms G to move backward, meanwhile keeping the clamping-bar depressed. When the arms G have reached the limit of their backward movement, the clamping-bar G⁴ is released, so as to again grip the web, at a point between the lower ends of the filled blanks and the upper ends of the empty blanks, and the operator tears off the filled blanks by an upward lateral movement against the front edge of the severing-bar. The subsequent operations of the mechanism are repetitions of those described above. After the carbon or transfer sheets B, B', have been used sufficiently long in their original positions, the rest-frame F is lifted or removed and the studs $h$ of the brackets H are inserted into the other holes $b'$, so as to set the sheets B, B', half a line forward or backward, and thus bring fresh transfer-surfaces into position. After these fresh surfaces have been depleted, the carbon-sheets are removed and entirely fresh sheets are substituted for them.

In Figs. 8, 9 and 10, we have shown a mechanism which embodied the essential principles of our invention, and also in many particulars, the same structural parts as previously described; these similar structural parts being designated by like reference-letters to those used in the preceding figures and description. In this instance, however, the swinging or tilting arms G are dispensed with and a sliding frame is employed; which, with its immediate actuating parts, we will now proceed to describe. I, I, designates two horizontal slide-arms each of which is mounted at the upper part of one of the sides of the box or casing C, these arms being arranged to move forward and rearward between suitable guide brackets or lugs $i$, which are secured to the sides of the casing and having upturned extensions I' which protrude somewhat beyond the front end of the box or casing, when the arms I are retracted. The upturned front portions I' of the arms I are connected together by a cross-bar $I^2$ which compels the two arms to move in unison with each other and which comes into contact with the front end of the box or casing, when the arms I are moved backward so as to limit such movement of the arms. The severing-bar $G^3$ is, in this instance, carried by the upper ends of the upturned end-portions I' and the clamping-bar $G^4$ is mounted loosely at its ends on the rod $g'$ which connects the said upturned portions. An actuating lever J is located at one side of the box or casing C and is pivoted at its lower end, as at J', to the lower part of the side of the casing, about midway of the length thereof. At its upper end, the actuating-lever J carries a suitable handle $j$ which is to be grasped by the operator, so as to effect the operative movements of said lever. About midway of its length, the lever J is formed with an elongated opening or slot $j'$ into which protrudes a stud or pin $j^2$ upon the corresponding slide-arm I. A spring $J^2$ is coiled around the pivot J' of this actuating-lever; one end of said spring being secured, as at $j^3$, to the side of the casing, and the other end being secured, as at $j^4$, to the lower part of the lever, and the tendency of the spring being to move the lever to the rearward limit of its movement. The clamping-bar $G^4$ carries at one end a crank-arm $k'$, to the outer end of which is connected a link-bar K', said link-bar extending rearwardly and being connected at its rear end, as at $k$, to the lower part of an auxiliary lever K. This lever K is pivoted at its lower end upon the stud $j^2$ above referred to as working in the slot $j'$ of the actuating-lever J. In using this form of the mechanism, the paper or web is placed, as before, in the box or casing C and is led upward through the rear end of the casing-top, and forward along the top and beneath the presser-rod $f^2$; the front end of the web being gripped by the clamping-bar $G^4$. After the uppermost blank-form has been filled, the actuating-lever J is swung forward so as to slide the arms I forward also and thus draw the filled blanks off of the top of the box or casing, and also to bring a set of unfilled blanks upon said top. At the beginning of the return movement of the lever J and sliding-arms I, the auxiliary lever K is swung backward so as to rock the clamping-bar $G^4$ downward and release the end of the strip or web. The lever K is held back until the lever J has reached the rearward limit of its movement, when the lever K is released, allowing the spring $g^2$ to throw the clamping-bar $G^4$ into position to again grip the strip or web; the protruding end-portion of the strip, carrying the filled blank-forms, being severed from the strip, along the bar $G^3$, as before. It will be observed that when the arms G carrying the clamping bar $G^4$ is moved backward over the drawn-out blank into position to again grasp the web or blank, the pressure rod or tension device $f^2$ acting upon the strip or web prevents any tendency to a rearward movement on the part of the said strip or web, as well as tending to insure the retention of the web on the table in a smooth and flat position.

We claim as our invention—

1. An autographic recording device, comprising a box or casing adapted to contain the blank forms, a gripping device for holding the ends of the blank forms, and means for conducting the blanks from within the casing over a suitable writing table by a forward or longitudinal movement of said gripping device, substantially as described.

2. In an autographic-recording device having a casing or box adapted to contain the blank forms and a writing table over which said forms are passed, the combination with a movable gripping device for holding the ends of the blanks during its outward movement, and adapted to release the ends of the blanks at the termination thereof, of a guard secured to the movable gripping and releasing device for sustaining the blank drawn from the casing or box during the return movement of the gripping device, substantially as described.

3. An autographic-recording mechanism comprising a casing, a swinging frame pivoted to the casing and carrying a gripping attachment, and a supporting arm carried by the upper part of the swinging frame and adapted to enter a suitable aperture in the casing when the swinging frame is in its normal position, substantially as set forth.

4. An autographic-recording mechanism, comprising a box or casing for containing the blank forms and a gripping device for holding the outer ends of the blanks movably connected to said box or casing, substantially as described.

5. An autographic-recording mechanism, comprising a box or casing for containing the blank forms, a frame pivotally connected to said casing, and a gripping device mounted on said pivoted frame for holding the outer ends of the blanks, substantially as set forth.

6. An autographic, recording mechanism, comprising a box or casing for containing the blank forms, and a frame movably connected to said casing, a gripping device secured to said frame for holding the ends of the blanks, and a severing device for separating said blanks, substantially as set forth.

7. In an autographic-recording mechanism, the combination with a box or casing adapted to contain blank forms, of a frame movably connected to said casing, and a gripping device upon said movable frame for holding the ends of the blanks, the gripping device consisting of an oscillatory gripping-bar, a straight-edge portion of said movable frame, and a spring or equivalent means acting upon said oscillatory bar to cause the latter normally to press against said straight-edge portion of the frame, substantially as set forth.

8. In an autographic-recording device, the combination with a casing adapted to contain the blanks, of a bar for holding the transfer sheets, said bar and the margin of the casing being provided with a plurality of interlocking pins and recesses, substantially as described.

9. In an autographic-recording device, the combination with a casing having a plurality of marginal upwardly extending pins or studs, of a bar for holding a transfer sheet in engagement with said studs, and means for retaining said bar in position upon said studs, substantially as described.

10. In an autographic-recording device, the combination with a casing, of a transfer or carbon sheet provided with a sustaining strip at one of its margins and movably secured over the table of the device, and means for moving the end of the blank longitudinally over said stationary transfer sheet, substantially as described.

11. In an autographic-recording device, the combination with a casing having a plurality of marginal upwardly extending pins or studs, of a carbon or transfer holding bar provided with a duplicate set of apertures adapted for engagement with said pins or studs, the sets of apertures being in longitudinal alignment, substantially as described.

12. In an autographic recording device, the combination with mechanism to intermittently draw the ends of a pile of blanks from within the casing over a writing table, of a carbon or transfer sheet provided with a sustaining strip at one of its margins and movably secured to the casing of said recording device, and means for giving longitudinal adjustment to said carbon sheet, substantially as and for the purpose specified.

13. An autographic-recording device, comprising a box or casing adapted to contain blank forms, a pair of arms pivoted at their lower ends to the casing and connected at their upper ends by a bar having a cutting or straight edge, and also provided at their upper ends with an oscillatory, spring-actuated gripping-bar normally in contact with said straight or cutting edge of the first mentioned bar whereby said two bars constitute a combined holding, releasing and severing device for the blank forms, substantially as set forth.

14. In an autographic-recording device having a casing adapted to contain blank forms and a writing table over which said forms are passed as they are drawn out of the casing, the combination with a movable gripping device for holding the ends of the blank during its forward movement, of a tension device interposed between the gripping device and the blank form within the box whereby the blank form upon the table is maintained taut, substantially as described.

15. In an autographic recording device having a casing adapted to contain the blank forms and wherein the form is drawn from the casing by the forward movement of a gripping device secured to the casing, the combination of said movable gripping device and a tension device applied to the top surface of the casing and adapted to prevent the drawn out blank from a backward movement when said gripping device is returned to its normal position, substantially as described.

In testimony that we claim the foregoing as our invention we affix our signatures in presence of two witnesses.

ROBERT J. COPELAND.
CHRISTIAN H. STOELTING.

Witnesses:
TAYLOR E. BROWN,
WILLIAM A. VAWTER.